(12) United States Patent
Ogawa

(10) Patent No.: US 9,895,839 B2
(45) Date of Patent: Feb. 20, 2018

(54) FASTENING STRUCTURE

(71) Applicant: TOYOTA JIDOSHA KABUSHIKI KAISHA, Toyota-shi, Aichi-ken (JP)

(72) Inventor: Satoshi Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/781,458

(22) PCT Filed: Aug. 12, 2014

(86) PCT No.: PCT/JP2014/071518
§ 371 (c)(1),
(2) Date: Sep. 30, 2015

(87) PCT Pub. No.: WO2015/064182
PCT Pub. Date: May 7, 2015

(65) Prior Publication Data
US 2016/0339630 A1 Nov. 24, 2016

(30) Foreign Application Priority Data
Oct. 30, 2013 (JP) ................................ 2013-225815

(51) Int. Cl.
B29C 65/00 (2006.01)
B29C 65/48 (2006.01)
(Continued)

(52) U.S. Cl.
CPC ............ *B29C 66/006* (2013.01); *B29C 65/48* (2013.01); *B29C 65/4835* (2013.01);
(Continued)

(58) Field of Classification Search
CPC ....... B29C 66/006; B29C 66/70; B29C 66/72; B29C 66/74; B29C 66/742; Y10T 403/75; F16B 11/006; F16B 47/003
See application file for complete search history.

(56) References Cited

U.S. PATENT DOCUMENTS 3,682,508 A * 8/1972 Briles ..................... F16B 4/004
403/408.1
4,221,041 A * 9/1980 Hufnagl ................... B21J 15/02
29/512

(Continued)

FOREIGN PATENT DOCUMENTS

JP S62-122783 U 8/1987
JP H09287609 A 11/1997
(Continued)

*Primary Examiner* — Jonathan P Masinick
(74) *Attorney, Agent, or Firm* — Oliff PLC

(57) ABSTRACT

A fastening structure (10) includes: a resin member (14) that contains a resin material, and that has a through-hole (14H) for mounting having a tapered inner wall surface (14T); a member for fastening (16) that is made of metal, and that has a collar portion (16C) that is inserted within the through-hole (14H) for mounting and whose intermediate portion has a tapered outer wall surface (16T) that abuts the tapered inner wall surface (14T), and a flange portion (16F) that projects out along an obverse face of the resin member (14) at an end portion (16Z) at a large-diameter side of the collar portion (16C); and an adhesive (18) that is provided between the obverse face (14A) of the resin member and the flange portion (16F), and that adheres the resin member (14) and the member for fastening (16).

3 Claims, 5 Drawing Sheets

(51) Int. Cl.
*B29C 65/56* (2006.01)
*B29C 65/64* (2006.01)
*B29C 65/72* (2006.01)
*B29C 65/78* (2006.01)
*F16B 11/00* (2006.01)
*F16B 5/02* (2006.01)
*B29L 31/00* (2006.01)
*B29L 31/30* (2006.01)
*B29K 307/04* (2006.01)

(52) U.S. Cl.
CPC ............ *B29C 65/562* (2013.01); *B29C 65/64* (2013.01); *B29C 65/72* (2013.01); *B29C 65/7826* (2013.01); *B29C 65/7829* (2013.01); *B29C 66/1122* (2013.01); *B29C 66/1222* (2013.01); *B29C 66/1226* (2013.01); *B29C 66/131* (2013.01); *B29C 66/21* (2013.01); *B29C 66/41* (2013.01); *B29C 66/7212* (2013.01); *B29C 66/742* (2013.01); *B29C 66/7422* (2013.01); *B29C 66/74283* (2013.01); *F16B 5/02* (2013.01); *F16B 11/006* (2013.01); *B29C 66/71* (2013.01); *B29K 2307/04* (2013.01); *B29L 2031/3002* (2013.01); *B29L 2031/3005* (2013.01); *B29L 2031/737* (2013.01)

(56) References Cited

U.S. PATENT DOCUMENTS

| | | | | |
|---|---|---|---|---|
| 4,238,165 A * | 12/1980 | Wagner | ................... | F16B 39/26 403/408.1 |
| 4,609,315 A * | 9/1986 | Briles | ................ | F16B 19/1045 403/408.1 |
| 5,079,055 A * | 1/1992 | Doyle | ..................... | B29C 70/24 411/427 |
| 5,141,375 A * | 8/1992 | Pollizzi | ............... | B05B 15/0412 411/258 |
| 6,083,604 A * | 7/2000 | Haraga | ..................... | F16B 5/00 403/375 |
| 6,488,458 B2 * | 12/2002 | Ninomiya | ............... | B23B 51/00 29/525 |
| 2001/0005473 A1 | 6/2001 | Shiokawa et al. | | |
| 2001/0007628 A1 | 7/2001 | Ninomiya et al. | | |
| 2002/0025239 A1 | 2/2002 | Ninomiya et al. | | |
| 2002/0051693 A1 | 5/2002 | Ninomiya et al. | | |
| 2003/0194289 A1 | 10/2003 | Ninomiya et al. | | |
| 2007/0258791 A1 * | 11/2007 | Davies | ................... | B60R 13/01 411/397 |
| 2009/0178262 A1 * | 7/2009 | Reid | ...................... | B21J 15/022 29/263 |
| 2009/0184569 A1 * | 7/2009 | Inagaki | ................. | B60T 13/567 303/115.3 |
| 2013/0340239 A1 * | 12/2013 | Ueda | ..................... | B21J 15/025 29/525.06 |

FOREIGN PATENT DOCUMENTS

| | | | |
|---|---|---|---|
| JP | 2007-303570 A | 11/2007 | |
| JP | 2007332980 A | 12/2007 | |
| JP | 2007332983 A | 12/2007 | |
| JP | 2008-215465 A | 9/2008 | |
| JP | 2009-204159 A | 9/2009 | |
| JP | 2012251583 A | 12/2012 | |
| WO | WO 2013072083 A1 * | 5/2013 | ............ F16B 11/006 |

* cited by examiner

FASTENING STRUCTURE

TECHNICAL FIELD

The present invention relates to a fastening structure.

BACKGROUND ART

A fastening portion structure for a vehicle is disclosed in Japanese Patent Application Laid-Open (JP-A) No. 2008-215465. In this fastening portion structure for a vehicle, a vehicle body skeleton member that is formed from a composite material of fibers and resin is fastened to a fastened-to member via a stepped washer made of metal. The stepped washer has a boss portion that is shaped as a short cylinder, and, at one axial direction end side of this boss portion, a flange portion having an enlarged diameter. The boss portion is inserted into a counterbored hole that is formed in the vehicle body skeleton member. The region between the boss portion and the flange portion, and the vehicle body skeleton member, is adhered via an adhesive.

On the other hand, a part fastening structure for a vehicle is disclosed in JP-A No. 2009-204159. In this part fastening structure for a vehicle, a flanged collar nut made of metal is used in the fastening of a fastened-to member and a vehicle body skeleton member that is made of FRP. The flanged collar nut has a collar portion that passes through a through-hole of the vehicle body skeleton member, and a flange portion that projects out from one end side of this collar portion. The collar portion is press-fit into the through-hole. An adhesive is provided between the flange portion and the vehicle body skeleton member. The flanged collar nut is thereby mounted to the vehicle body skeleton member.

SUMMARY OF INVENTION

Technical Problem

In the fastening portion structure for a vehicle that is disclosed in JP-A No. 2008-215465, the surface direction load from the stepped washer to the vehicle body skeleton member is inputted via the adhesive that is formed between the boss portion and the counterbored hole. Because the modulus of elasticity of the adhesive is lower than the modulus of elasticity of the stepped washer, the rigidity at the connection region of the stepped washer and the vehicle body skeleton member decreases. Moreover, because creeping due to deterioration over time or due to heat arises at resin-based adhesives, the rigidity of the connection region decreases due to this point as well.

Further, in the part fastening structure for a vehicle that is disclosed in JP-A No. 2009-204159, the collar portion is press-fit into the through-hole. Therefore, the rigidity of the connection region of the through-hole and the collar portion is improved more than in the fastening portion structure for a vehicle disclosed in JP-A No. 2008-215465. However, there is the possibility that damage, such as cracking or the like, will arise at the periphery of the through hole of the vehicle body skeleton member at the time of press-fitting the collar portion.

Therefore, there is room for improvement with regard to the rigidity at the connection region of the resin member and the metal member, and damage to the resin member.

In consideration of the above-described circumstances, the present invention provides a fastening structure that can ensure the rigidity at the connection region of a resin member that contains a resin material and a part for fastening that is made of metal, and that can effectively suppress or prevent damage to the resin member at the time of manufacturing.

Solution to Problem

A fastening structure relating to a first aspect of the present invention includes: a resin member that contains a resin material, and that has a through-hole for mounting having a tapered inner wall surface whose diameter decreases from an obverse face toward a reverse face of the resin member; a member for fastening that is made of metal, and that has a collar portion that is inserted within the through-hole for mounting and whose intermediate portion has a tapered outer wall surface that abuts the tapered inner wall surface, and a flange portion that projects out along the obverse face of the resin member at an end portion at a large-diameter side of the collar portion; and an adhesive that is provided between the obverse face of the resin member and the flange portion, and that adheres together the resin member and the member for fastening.

In the fastening structure relating to the first aspect of the present invention, the collar portion of the member for fastening that is made of metal is inserted in the through-hole for mounting of the resin member that contains a resin material. The adhesive is provided between the obverse face of the resin member and the flange portion, and the resin member is adhered to the member for fastening by this adhesive.

Here, the through-hole for mounting is formed by a tapered inner wall surface whose diameter decreases from the obverse face toward the reverse face of the resin member. The intermediate portion of the collar portion is formed by a tapered outer wall surface that abuts the tapered inner wall surface. Therefore, the region of abutment of the tapered inner wall surface and the tapered outer wall surface is the connection region, and the resin member and the member for fastening are directly connected at this connection region without press-fitting.

In a fastening structure relating to a second aspect of the present invention, in the first aspect of the present invention, an end portion at a small-diameter side of the collar portion may project out further than the reverse face of the resin member.

In accordance with the fastening structure relating to the second aspect of the present invention, the end portion at the small-diameter side of the collar portion projects out further than the reverse face of the resin member. Therefore, fastening load is not applied to the resin member and the adhesive.

In a fastening structure relating to a third aspect of the present invention, in the first or second aspect of the present invention, the through-hole for mounting may include a tapered hole that has the tapered inner wall surface and that is formed from the obverse face of the resin member toward the reverse face, and a through-hole that is connected to a small-diameter side of the tapered hole and that passes through to the reverse face of the resin member and whose inner wall surface is a cylindrical surface.

In accordance with the fastening structure relating to the third aspect of the present invention, the through-hole for mounting of the resin member may connect a tapered hole, that has a tapered inner wall surface, and a through-hole, whose inner wall surface is a cylindrical surface. The tapered hole can be formed easily by molding of the resin member. At the time of molding, if it is made such that the resin material can be filled into this region without forming the through-hole, generation of a weld line at the resin member can be effectively suppressed or prevented. In addition, the through-hole can be formed easily by mechanical working for example, as compared with the tapered hole.

Advantageous Effects of Invention

The fastening structure relating to the first aspect of the present invention has the excellent effects of being able to ensure the rigidity at a connection region between a resin member and a member for fastening that is made of metal, and being able to effectively suppress or prevent damage to the resin member at the time of manufacturing.

The fastening structure relating to the second aspect of the present invention has the excellent effect of being able to effectively suppress or prevent a decrease in the fastening force due to creeping or changes over time in a resin member and an adhesive, because fastening load is not applied to the resin member and the adhesive.

The fastening structure relating to the third aspect of the present invention has the excellent effect of, in a resin member, being able to easily form a through-hole for mounting while effectively eliminating defective places at the peripheral portion of the through-hole for mounting.

DESCRIPTION OF EMBODIMENTS

First Embodiment

Figure 1:
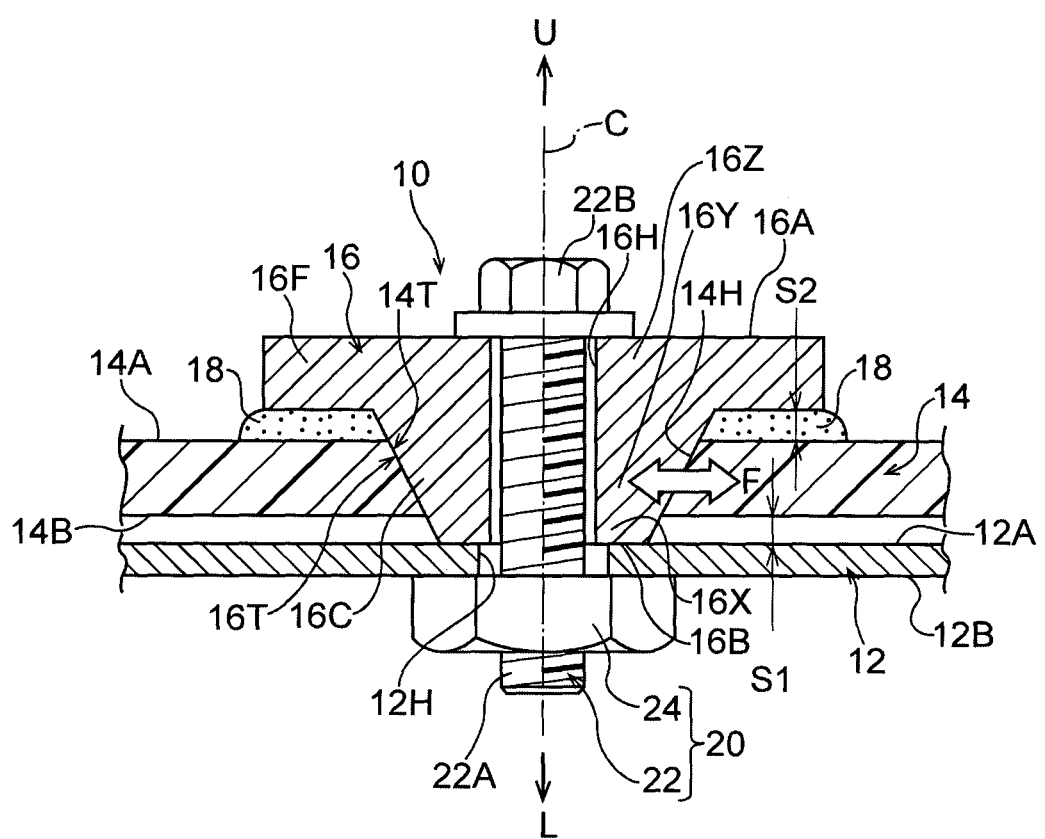
FIG. 1 is a cross-sectional view of main portions of a fastening structure relating to a first embodiment.

A fastening structure relating to a first embodiment of the present invention is described by using FIG. 1 through FIG. 6. Note that, for convenience of explanation, description is given with the side indicated by arrow U, that is shown appropriately in the drawings, being the upper side, and the side indicated by arrow L being the lower side. However, the directions of application of the fastening structure to a vehicle body of an automobile or the like are not limited thereto.

(Structure of Fastening Structure)

As shown in FIG. 1, in a fastening structure 10 at a vehicle such as an automobile or the like, a resin member 14 that contains a resin material is mounted to a member 16 for fastening that is made of metal, and a fastened-to member 12 that is made of metal and the member 16 for fastening are fastened and fixed by fastening means 20. In the present embodiment, the fastened-to member 12 is, for example, a vehicle body skeleton member that is made of metal, and the resin member 14 is, for example, the resin hinge portion of an engine hood, a door panel, or a back door panel. In other words, the fastening structure 10 relating to the present embodiment is a structure that fastens together members that are formed of different types of materials. Note that the specific materials are not limited to the above-described examples.

The fastened-to member 12 is formed by a metal plate that contains, for example, a ferrous material, an aluminum material, an aluminum alloy material, or the like. A first through-hole 12H for fastening, that passes through from an obverse face 12A to a reverse face 12B at the place of fastening, is provided in the fastened-to member 12. This first through-hole 12H for fastening is formed as a through-hole, that has a cylindrical surface, along an axial direction coinciding with central axis C that is shown for convenience. Here, the shape of the opening of the first through-hole 12H for fastening as seen in plan view is circular, but is not particularly limited to this shape. For example, the shape of the opening may be oval, rectangular, long-hole-shaped, or the like. Further, although the fastened-to member 12 is plate-shaped here, it may be, for example, block-shaped.

The resin member 14 is formed of, for example, a carbon fiber reinforced plastic (CFRP) material that serves as a composite material in which carbon fibers are strengthened by resin, or a glass fiber reinforced plastic (GFRP) material that serves as a composite material in which glass fibers are strengthened by resin, or the like. Further, a sheet molding compound (SMC) material, in which glass fibers are impregnated into a compound that combines an unsaturated polyester resin and a filler such as calcium carbonate or the like, can be used as the resin member 14. These plastic materials may be a plate of a single layer, or may be a multilayer plate in which the plastic materials are layered in plural layers and are strengthened by a resin. Further, the resin member 14 may be block-shaped for example. A through-hole 14H for mounting, whose diameter decreases from an obverse face 14A toward a reverse face 14B, is formed in the resin member 14. The center of this through-hole 14H for mounting coincides with the center of the first through-hole 12H for fastening (the central axis C coincides). Because the diameter of the through-hole 14H for mounting decreases, the inner wall of the through-hole 14H for mounting is a tapered inner wall surface 14T. Here, the angle of tapering is not particularly limited, but it is preferable that the tapered inner wall surface 14T be set to be within a range of angles that are, for example, greater than or equal to 30° and less than or equal to 60° with respect to the central axis C. The resin member 14 is disposed so as to face the fastened-to member 12 with the reverse face 14B of the resin member 14 and the obverse face 12A of the fastened-to member 12 being made to face one another.

The member 16 for fastening is a flanged collar that is inserted into the through-hole 14H for mounting of the resin member 14. To describe in further detail, the member 16 for fastening has a collar portion 16C and a flange portion 16F, and further, a second through-hole 16H for fastening is formed in the collar portion 16C. One end surface (reverse face) 16B of an end portion 16X at the small-diameter side (that coincides with the arrow L direction) of the collar portion 16C is made to abut the obverse face 12A of the fastened-to member 12. The one end surface 16B of the end portion 16X projects out further toward the fastened-to member 12 side than the reverse face 14B of the resin member 14, and abuts the obverse face 12A of the fastened-to member 12. Therefore, a gap S1 is formed between the fastened-to member 12 and the resin member 14. In order to make the one end surface 16B and the obverse face 12A abut one another, the outer diameter of the one end surface 16B is set to be larger than the inner diameter of the first through-hole 12H for fastening, as seen in plan view. An intermediate portion 16Y of the collar portion 16C has a tapered outer wall surface 16T that abuts and is fit-into the tapered inner wall surface 14T of the through-hole 14H for mounting. The flange portion 16F is provided integrally with an end portion 16Z that is the large-diameter side of the collar portion 16C, and has a shape that projects out from the collar portion 16C along another end surface (obverse face) 16A of the resin member 16. Namely, as seen in plan view, the outer diameter of the flange portion 16F is set to be larger than the inner diameter at the large-diameter side of the through-hole 14H for mounting. The second through-hole 16H for fastening is made to coincide with the centers of the first through-hole 1211 for fastening and the through-hole 14H for mounting, and passes through the collar portion 16C in the vertical (upward-downward) direction from the one end surface 16B to the other end surface 16A. This second through-hole 1611 for fastening is formed by a through-hole, that has a cylindrical surface, along an axial direction that coincides with the central axis C. The member 16 for fastening is formed as a metal block that contains, for example, a ferrous material, an aluminum material, an aluminum alloy material, or the like.

In the present embodiment, an adhesive 18 is provided between the flange portion 16F of the member 16 for fastening and the obverse face 14A of the resin member 14 that faces this flange portion 16F. The resin member 14 is adhered and fixed to the member 16 for fastening by this adhesive 18. At this time, the collar portion 16C of the member 16 for fastening is inserted into the through-hole 14H for mounting of the resin member 14, and the tapered outer wall surface 16T of the collar portion 16C and the tapered inner wall surface 14T of the through-hole 14H for mounting are in a state of abutting one another. The adhesive 18 is a resin adhesive, but is not particularly limited to this example, and may be formed by, for example, a thermosetting epoxy adhesive. Because the adhesive 18 is a resin adhesive, the modulus of elasticity of the adhesive 18 is lower than the modulus of elasticity of the member 16 for fastening or the fastened-to member 12.

In the present embodiment, the fastening means 20 has a bolt 22 and a nut 24. The bolt 22 has a screw portion (male screw portion) 22A that is provided so as to pass through the first through-hole 12H for fastening and the second through-hole 16H for fastening, and a bolt head 22B that is provided at the one end at the member 16 for fastening side of the screw portion 22A so as to abut the other end surface 16A of the member 16 for fastening. The nut 24 has an unillustrated screw portion (female screw portion) that is screwed together with the screw portion 22A. The member 16 for fastening 16 and the fastened-to member 12 are interposed between the nut 24 and the bolt head 22B, and the nut 24 abuts the reverse face 12A of the fastened-to member 12. Due to the screw portion of the nut 24 being screwed-together with the screw portion 22A, fastening load acts along the central axis C on the fastened-to member 12 and the member 16 for fastening.

Operation and Effects of Present Embodiment

At the fastening structure 10 relating to the present embodiment, as shown in FIG. 1, the member 16 for fastening that is made of metal is inserted into the through-hole 14H for mounting of the resin member 14 that contains a resin material. Then, the fastened-to member 12 and the member 16 for fastening are fastened and fixed by the fastening means 20.

Here, the through-hole 14H for mounting is formed by the tapered inner wall surface 14T whose diameter decreases from the obverse face 14A of the resin member 14 toward the reverse face 14B, and the intermediate portion of the collar portion 16C is formed by the tapered outer wall surface 16T that is made to abut the tapered inner wall surface 14T. Therefore, the region of abutment of the tapered inner wall surface 14T and the tapered outer wall surface 16T is the connection region, and the resin member 14 and the member 16 for fastening are directly connected at this connection region. At this connection region, planar direction load F (see FIG. 1) is directly transmitted between the member 16 for fastening and the resin member 14. In addition, because the adhesive 18 is provided between the obverse face 14A of the resin member 14 and the flange portion 16F, the resin member 14 is adhered to the member 16 for fastening by this adhesive 18. Moreover, the collar portion 16C of the member 16 for fastening is inserted in the through-hole 14H for mounting of the resin member 14, and the tapered outer wall surface 16T of the collar portion 16C abuts the tapered inner wall surface 14T of the through-hole 14H for mounting. Therefore, because the collar portion 16C is not press-fit into the through-hole 14H for mounting, cracking that accompanies press-fitting into the resin member 14 does not arise at the periphery of the through-hole 14H for mounting. Further, in a case in which the resin member 14 is formed by a layered body in which composite materials are layered, separation between layers that accompanies press-fitting into the resin member 14 does not arise.

Accordingly, in accordance with the fastening structure 10 relating to the present embodiment, the rigidity at the connection region of the resin member 14 and the member 16 for fastening can be improved, and damage to the resin member 14 can be effectively suppressed or prevented.

Further, in the fastening structure 10 relating to the present embodiment, the end portion 16X of the collar portion 16C projects out further toward the fastened-to member 12 side than the reverse face 14B of the resin member 14, and abuts the fastened-to member 12. The fastening load can be applied to this end portion 16X between the end portion 16X and the fastened-to member 12. Therefore, the fastening load that is applied by the fastening means 20 is not applied to the resin member 14 and the adhesive 18.

Accordingly, in accordance with the fastening structure 10 relating to the present embodiment, because fastening load is not applied to the resin member 14 and the adhesive 18, a decrease in the fastening force due to creeping or changes over time of the resin member 14 and the adhesive 18 can be effectively suppressed or prevented.

Figure 2:
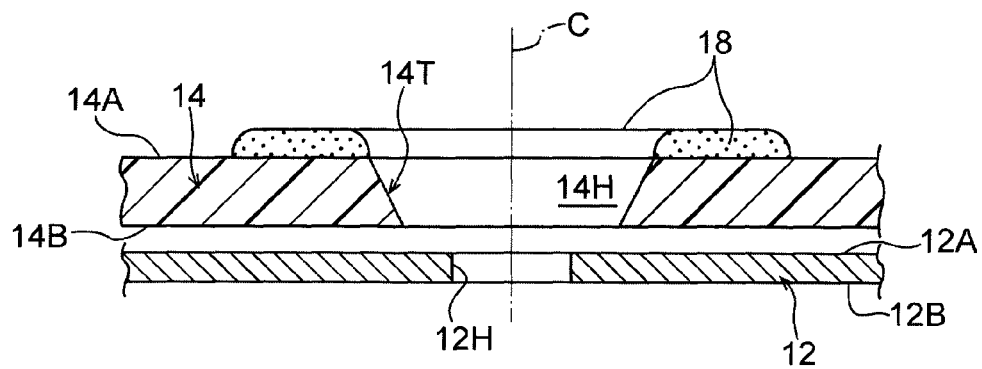
FIG. 2 is a process cross-sectional view of the fastening structure, showing a state after the end of a coating step in the fastening work.
Figure 3:
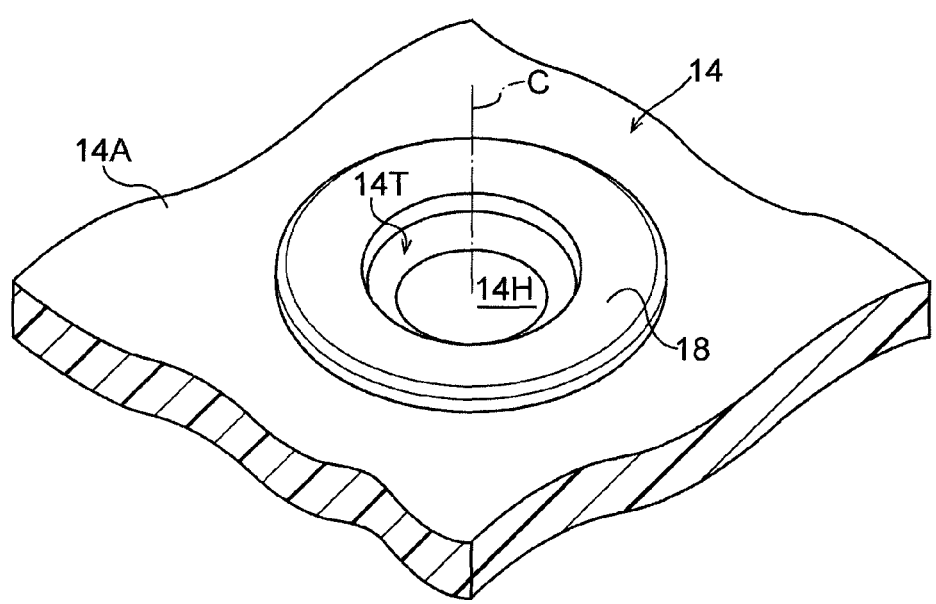
FIG. 3 is a process perspective view of the fastening structure shown in FIG. 2.

Moreover, in the fastening structure 10 relating to the present embodiment, the through-hole 14H for mounting of the resin member 14 and the collar portion 16C of the member 16 for fastening closely contact one another at the tapered inner wall surface 14T and the tapered outer wall surface 16T, and no gap is formed. Therefore, there is no need to provide the adhesive 18 between the tapered inner wall surface 14T and the tapered outer wall surface 16T. Thus, in the fastening structure 10, the surface area of coating of the adhesive 18 can be reduced as compared with the fastening portion structure for a vehicle that is disclosed in JP-A No. 2008-215465. Here, as shown in FIG. 2 and FIG. 3, the adhesive 18 is coated in a non-hardened state on to the obverse face 14A of the resin member 14 at the periphery of the through-hole 14H for mounting, by a coating step in the fastening work. In this coating process, the adhesive 18 is coated two-dimensionally only on the obverse face 14A of the resin member 14. Therefore, the work is simple and is carried out in a short time as compared with three-dimensional coating in which an adhesive is coated on the obverse face 14A and on the inner wall of the through-hole 14H for mounting. Three-dimensional coating is carried out by manual work. Therefore, in the fastening work in the present embodiment, introduction of an automatic adhesive coating device into the step of coating the adhesive 18 is possible, and automation of the coating work is possible. Due thereto, at the fastening structure 10 relating to the present embodiment, the workability in the step of coating the adhesive 18 can be improved. Further, in accordance with the fastening structure 10 relating to the present embodiment, if it is made such that the adhesive 18 is coated onto the obverse face 14A of the resin member 14 at the periphery of the through-hole 14H for mounting, the coating work is simplified, and work of coating the adhesive 18 by using an automatic adhesive coating device becomes possible. Therefore, the workability in the coating step can be improved.

Further, at the fastening structure 10 relating to the present embodiment, the adhesive 18 is coated onto the obverse face 14A of the resin member 14 that faces the flange portion 16F of the member 16 for fastening. In a case in which dispersion arises in the position of the resin member 14 in the central axis C direction with respect to the member 16 for fastening due to dispersion in the processing of the tapered inner wall surface 14T and the tapered outer wall surface 16T, the thickness of the adhesive 18 is adjusted in accordance with the dispersion in the position of the resin member 14. In other words, the thickness of the adhesive 18 is adjusted in accordance with the dispersion in a gap S2 (see FIG. 1) between the flange portion 16F of the member 16 for fastening and the obverse face 14A of the resin member 14.

First Modified Example

A first modified example and a second modified example of the first embodiment are described by methods of manufacturing suitable modified examples of the resin member 14 in the fastening structure 10. Note that, in the first modified example and in modified examples and a second embodiment that are described hereafter, structural elements that are the same as or equivalent to structural elements of the fastening structure 10 relating to the first embodiment are denoted by the same reference numerals, and description of structural elements that are denoted by the same reference numerals will be omitted as it would be redundant.

Figure 4A:
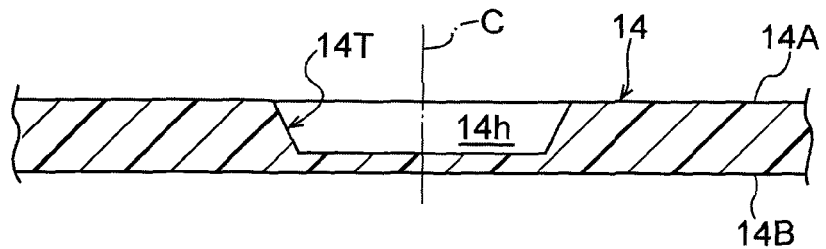
FIG. 4A is a cross-sectional view of main portions after molding processing of a fastened-to member that is applied to a fastening structure relating to a first modified example.
Figure 4B:
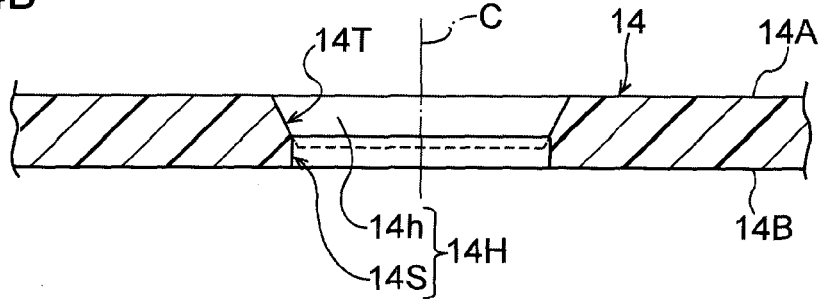
FIG. 4B is a cross-sectional view of main portions after through-hole formation of the fastened-to member that is applied to the fastening structure relating to the first modified example.

FIG. 4A and FIG. 4B are process cross-sectional views that explain, per step, a method of manufacturing the resin member 14. First, as shown in FIG. 4A, the resin member 14, that is plate-shaped and that has a concave portion 14h that is an upside-down trapezoidal tapered hole (stop hole) in cross-section, is formed at a portion in the central axis direction C from the obverse face 14A toward the reverse face 14B, at the region of formation of the through-hole 14H for mounting. The tapered inner wall surface 14T is formed at the inner wall of the concave portion 14h. This resin member 14 is formed by using an unillustrated molding die at which a projecting portion that corresponds to the concave portion 14h is provided within a cavity, by injection molding or SMC molding that fills a molding material into the cavity of this molding die.

Next, as shown in FIG. 4B, a through-hole 14S, that passes through from the bottom surface of the concave portion 14h, i.e., the small diameter side of the tapered hole, toward the reverse face 14B and whose inner wall surface is a cylindrical surface, is formed in the molded resin member 14. Due thereto, the through-hole 14H for mounting, at which the through-hole 14S and the concave portion 14h having the tapered inner wall surface 14T are connected along the central axis C direction, is formed in the resin member 14. The through-hole 14S is formed, for example, by drill machining, punching machining, laser machining or the like.

In the fastening structure 10 relating to the first modified example, the through-hole 14H for mounting of the resin member 14 joins a tapered hole (the concave portion 14h), that has the tapered inner wall surface 14T, and the through-hole 14S, whose inner wall surface is a cylindrical surface. The tapered hole can be formed easily by molding the resin member 14. At the time of molding, if it can be made such that the resin material is filled into the region of the tapered hole without forming the through-hole 14S, the resin material is blocked and diverted at the region of the tapered hole within the molding die, and is filled into the entire region without merging again. Therefore, the generation of a weld line at the resin member 14 can be effectively suppressed or prevented. In addition, the through-hole 14S can be formed easily by mechanical working for example, as compared with the tapered hole.

Accordingly, in accordance with the fastening structure 10 relating to the first modified example, at the resin member 14, the through-hole 1411 for mounting can be formed easily while defective places that accompany the molding processing of the peripheral portion of the through-hole 14H for mounting are effectively eliminated.

Second Modified Example

Figure 5A:
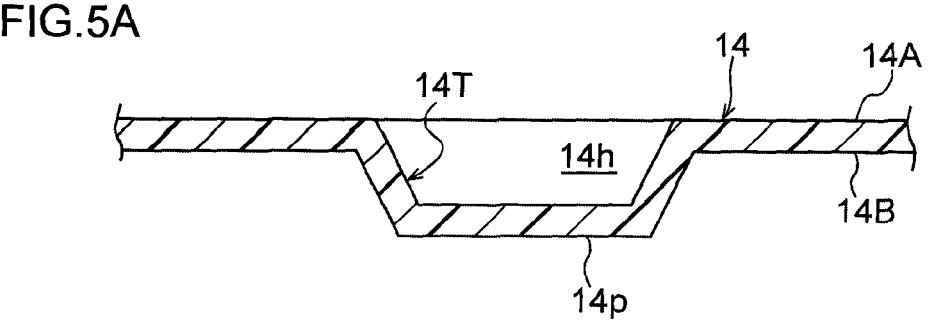
FIG. 5A is a cross-sectional view of main portions after molding processing of a fastened-to member that is applied to a fastening structure relating to a second modified example.
Figure 5B:
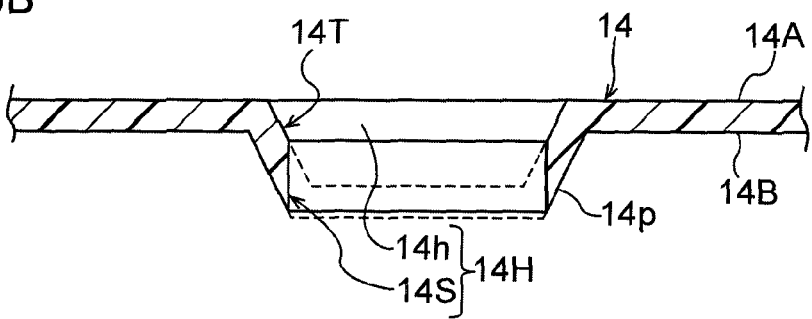
FIG. 5B is a cross-sectional view of main portions after through-hole formation of the fastened-to member that is applied to the fastening structure relating to the second modified example.

FIG. 5A and FIG. 5B are process cross-sectional views that explain, per step, another method of manufacturing the resin member 14. First, as shown in FIG. 5A, the resin member 14 that is plate-shaped and that has a convex portion 14p, that is shaped as an upside-down trapezoid in cross-section and that projects out from the reverse face 14B at the region of formation of the through-hole 1411 for mounting, and the concave portion 14h (tapered hole), that is shaped as an upside-down trapezoid in cross-section and that is recessed at the inner portion of the convex portion 14p, is formed. The tapered inner wall surface 14T is formed at the inner wall of the concave portion 14h, in the same way as at the concave portion 14h of the first modified example.

Further, in the same way as the resin member 14 of the first modified example, the resin member 14 is formed by molding using a molding die.

Next, as shown in FIG. 5B, the through-hole 14S, whose inner wall surface is a cylindrical surface and that passes through from the bottom surface of the concave portion 14*h* toward the reverse face 14B that is the top surface of the convex portion Hp, is formed in the molded resin member 14. Due thereto, the through-hole 14H for mounting, at which the through-hole 14S and the concave portion 14*h* are connected, is formed in the resin member 14.

In the fastening structure 10 relating to the second modified example, operation and effects, that are similar to the operation and effects obtained by the fastening structure 10 relating to the first modified example, can be obtained.

Third Modified Example

In the fastening structure 10 relating to the above-described first embodiment, the gap S1 is provided between the fastened-to member 12 and the resin member 14 also at places other than the place of fastening. The third modified example describes an example of properly maintaining the gap S1.

Figure 6A:
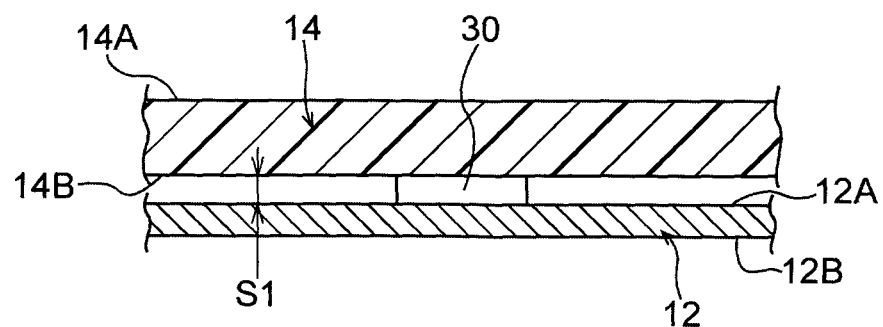
FIG. 6A is a cross-sectional view of main portions showing a peripheral place of a fastening structure relating to a third modified example.

In the fastening structure 10 shown in FIG. 6A, a gap member 30 is provided between the obverse face 12A of the fastened-to member 12 and the reverse face 14B of the resin member 14, at a place other than the place of fastening. The gap member 30 is adhered to at least one of the obverse face 12A and the reverse face 14B by, for example, an adhesive material.

Figure 6B:
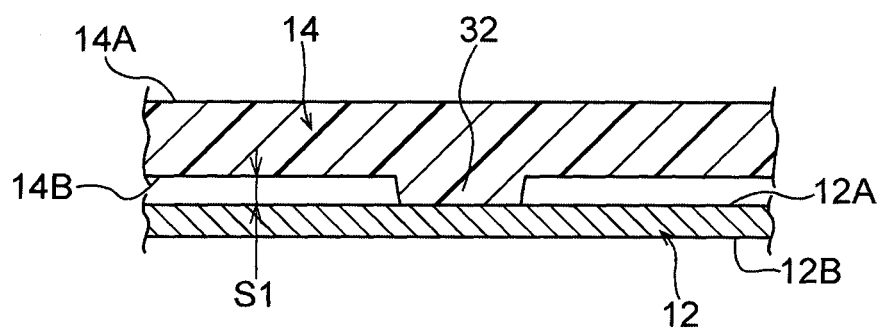
FIG. 6B is a cross-sectional view of main portions that corresponds to FIG. 6A and shows another example of the fastening structure relating to the third modified example.

In the fastening structure 10 shown in FIG. 6B, a gap portion 32, that projects out from the reverse face 14B of the resin member 14 toward the obverse face 12A of the fastened-to member 12 and abuts the obverse face 12A, is provided at a place other than the place of fastening. The gap portion 32 is formed integrally with the resin member 14.

Figure 6C:
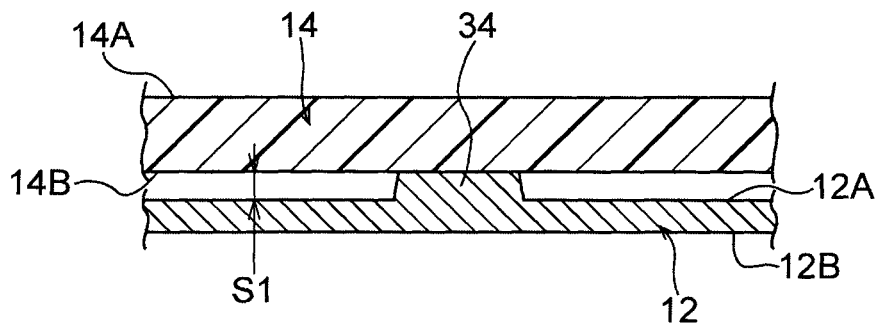
FIG. 6C is a cross-sectional view of main portions that corresponds to FIG. 6A and shows yet another example of the fastening structure relating to the third modified example.

In the fastening structure 10 shown in FIG. 6C, a gap portion 34, that projects out from the obverse face 12A of the fastened-to member 12 toward the reverse face 14B of the resin member 14 and abuts the reverse face 14B, is provided at a place other than the place of fastening. The gap portion 34 is formed integrally with the fastened-to member 12.

In accordance with the fastening structure 10 relating to the third modified example, the gap S1 between the fastened-to member 12 and the resin member 14 can be properly maintained by the gap member 30, the gap portion 32 or the gap portion 34, also at places other than the place of fastening.

Second Embodiment

Figure 7:
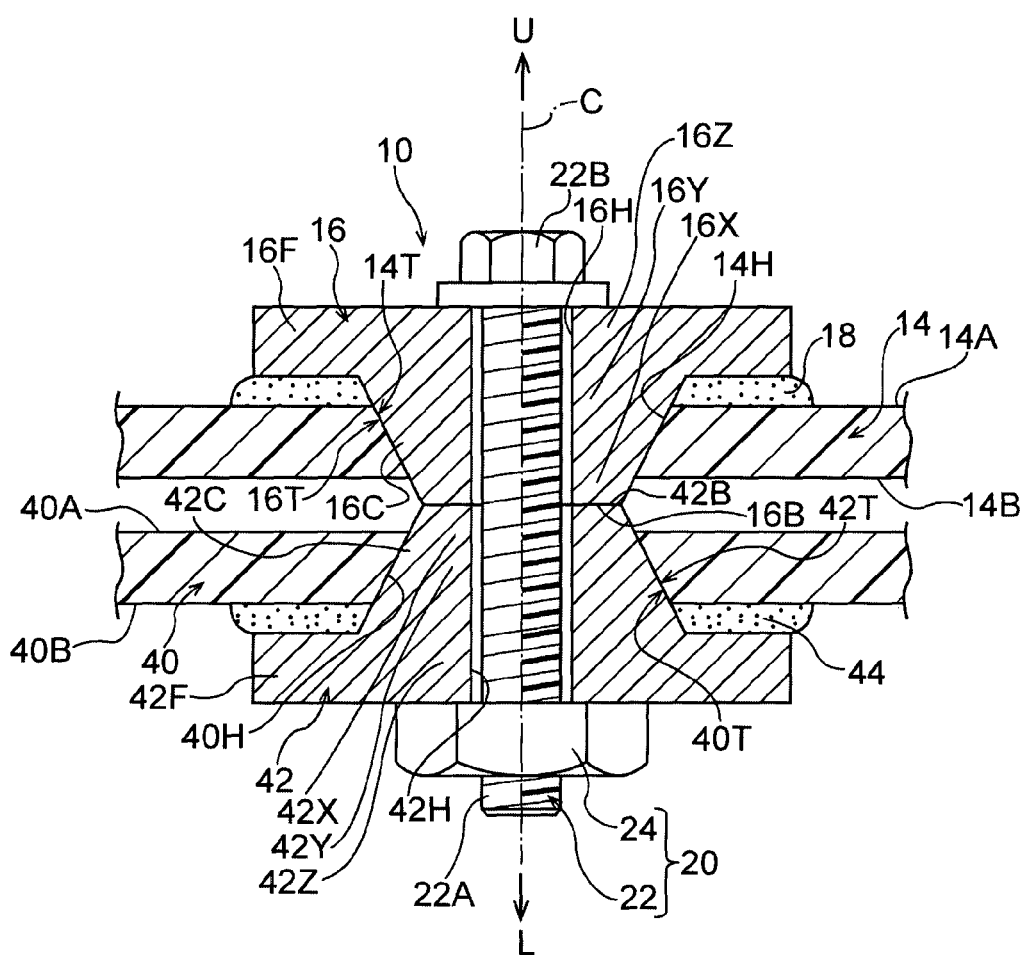
FIG. 7 is a cross-sectional view of main portions of a fastening structure relating to a second embodiment.

A fastening structure relating to a second embodiment of the present invention is described by using FIG. 7. The second embodiment is an applied example of the fastening structure 10 relating to the first embodiment, and explanation is given of a fastening structure that has plural fastened-to members that contain a resin material.

(Structure of Fastening Structure)

As shown in FIG. 7, in the fastening structure 10 relating to the second embodiment, the resin member 14 that contains a resin material is mounted to the member 16 for fastening that is made of metal, and similarly, a resin member 40 that contains a resin material is mounted to a member 42 for fastening that is made of metal, and the member 14 for fastening and the member 42 for fastening are fastened and fixed by the fixing means 20. The respective structures of the resin member 14, the member 16 for fastening and the fastening means 20 are the same as the structures of the resin member 14, the member 16 for fastening and the fastening means 20 in the first embodiment.

The resin member 40 has the same structure as the resin member 14, and is disposed with the up-down directions thereof being inverted as compared with the resin member 14. A through-hole 40H for mounting, that has a tapered inner wall surface 40T whose diameter decreases from a reverse face 40B toward an obverse face 40A, is formed in this resin member 40. The member 42 for fastening has the same structure as the member 16 for fastening, and is disposed with the up-down directions thereof being inverted as compared with the member 16 for fastening. The member 42 for fastening has a collar portion 42C and a flange portion 42F, and a third through-hole 42H for fastening is formed in the collar portion 42C. One end surface 42B of an end portion 42X of the collar portion 42C abuts the one end surface 16B of the collar portion 16C. A tapered outer wall surface 42T is formed at an intermediate portion 42Y of the collar portion 42C, and the flange portion 42F is provided at an end portion 42Z. An adhesive 44 is the same as the adhesive 18.

Operation and Effects of Present Embodiment

The fastening structure 10 relating to the present embodiment can obtain operation and effects that are similar to the operation and effects obtained by the fastening structure 10 relating to the above-described first embodiment.

Supplemental Description of the Above-Described Embodiments

The present invention is not limited to the above-described embodiments, and can be changed in various ways within a scope that does not depart from the gist thereof. For example, the fastening structure relating to the present invention is not limited to the hinge portion that is exemplified as the above-described resin member, and can be applied also to cases of fixing an exterior part such as an engine hood or the like that is made of resin, or an interior part such as an instrument panel or the like that is made of resin. Further, in the fastening structure relating to the second embodiment, the fastened-to member that is made of metal may be interposed between the upper and lower members for fastening, and the fastening load may be applied to the upper and lower members for fastening and the fastened-to member.

The disclosure of Japanese Patent Application No. 2013-225815, filed Oct. 30, 2013, is incorporated herein by reference in its entirety. All publications, patent applications, and technical standards mentioned in this specification are herein incorporated by reference to the same extent as if each individual publication, patent application, or technical standard was specifically and individually indicated to be incorporated by reference.

The invention claimed is:

1. A fastening structure, comprising:
   a resin member that contains a resin material, and that has a through-hole for mounting having a tapered inner wall surface whose diameter decreases from an obverse face toward a reverse face of the resin member;
   a fastened-to member that is disposed to face the resin member;

a member for fastening that is made of metal, and that has a collar portion that is inserted within the through-hole for mounting and that includes an intermediate portion having a tapered outer wall surface configured to directly contact the tapered inner wall surface, and a flange portion that projects out along the obverse face of the resin member at an end portion at a large-diameter side of the collar portion, an end portion at a small-diameter side of the collar portion projecting out further than the reverse face of the resin member and abutting the fastened-to member;

an adhesive that is provided between the obverse face of the resin member and the flange portion, and that adheres together the resin member and the member for fastening; and a fastener that produces a fastening load applied to the fastened-to member and the member for fastening and not applied to the resin member and the adhesive.

2. The fastening structure of claim 1, wherein the through-hole for mounting includes:

a tapered hole that has the tapered inner wall surface and that is formed from the obverse face of the resin member toward the reverse face; and a through-hole that is connected to a small-diameter side of the tapered hole and that passes through to the reverse face of the resin member and whose inner wall surface is a cylindrical surface.

3. The fastening structure of claim 1, wherein the adhesive is only provided between the obverse face of the resin member and the flange portion.

* * * * *